United States Patent

Greenberg

[15] 3,647,358
[45] Mar. 7, 1972

[54] METHOD OF CATALYTICALLY INDUCING OXIDATION OF CARBONACEOUS MATERIALS BY THE USE OF MOLTEN SALTS

[72] Inventor: Jacob Greenberg, Ventnor City, N.J.
[73] Assignee: Anti-Pollution Systems, Inc., Pleasantville, N.J.
[22] Filed: July 23, 1970
[21] Appl. No.: 57,593

Related U.S. Application Data

[63] Continuation-in-part of Ser. No. 781,495, Dec. 5, 1968, abandoned, and a continuation-in-part of 781,383, Dec. 5, 1968, abandoned.

[52] U.S. Cl. .................................. 23/2 R, 23/1 D, 23/2 E, 23/150
[51] Int. Cl. ............................................................. B01d 53/34
[58] Field of Search .................. 23/2, 150, 1 D, 2 S, 2 E, 178, 23/178 S; 48/92

[56] References Cited

UNITED STATES PATENTS

| 3,505,018 | 4/1970 | Bawa et al. | 23/150 X |
| 2,031,987 | 2/1936 | Sullivan | 48/92 X |
| 2,844,453 | 7/1958 | Kapp et al. | 48/92 X |
| 2,953,445 | 9/1960 | Rummel | 48/92 X |
| 3,533,739 | 10/1970 | Pelczarski et al. | 48/92 X |
| 3,552,921 | 1/1971 | Blytas | 23/178 |
| 3,438,722 | 4/1969 | Heredy et al. | 23/2 |

OTHER PUBLICATIONS

A.P.C. Application of Beck et al., Serial No. 292,742, Published July 13, 1943.
A.P.C. Application of Beck et al., Serial No. 393,258, Published July 13, 1943.

*Primary Examiner*—Earl C. Thomas
*Attorney*—Paul & Paul

[57] ABSTRACT

Oxidation of gaseous, liquid and solid carbonaceous materials, with removal of normally unburned pollutant products of combustion such as carbon, carbon monoxide and hydrocarbons, by contacting such materials with a molten salt. The molten salt acts as a catalyst in inducing relatively complete oxidation of the materials at temperatures below their normal combustion temperatures, and with substantial decrease in the unburned pollutant products. In one form, the salt may be a neutral salt with which the material, in the presence of oxygen, is contacted. In another form, the catalytic salt also contains a chemical oxidizer which continuously releases nascent oxygen and retakes ambient oxygen, thereby maintaining an equilibrium pressure of oxygen gas which aids the oxidation process.

47 Claims, 5 Drawing Figures

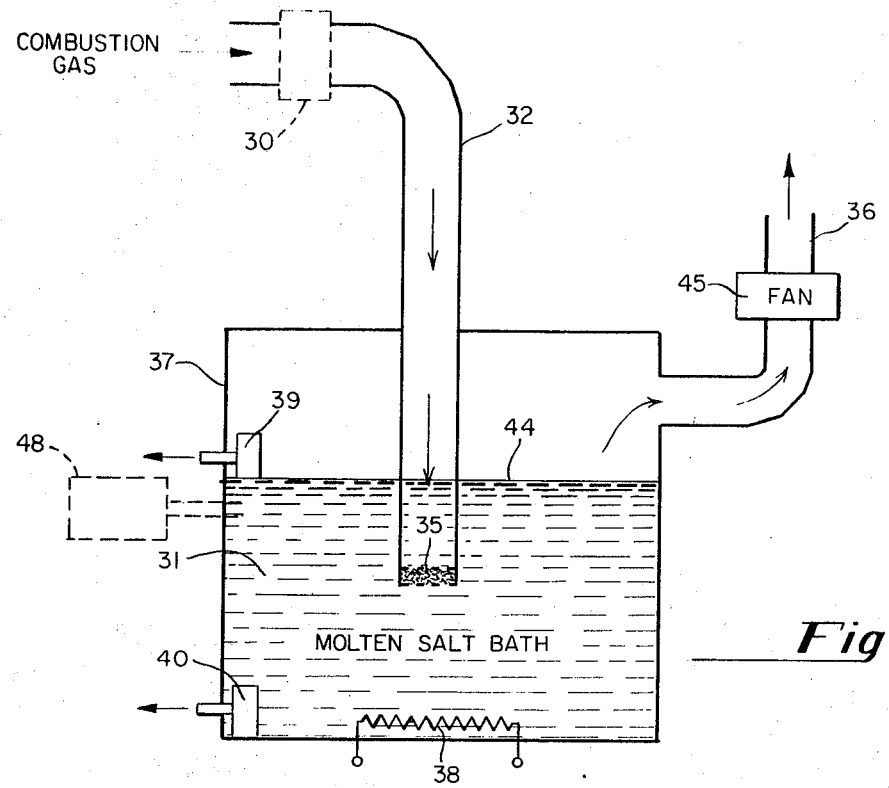
*Fig. 1*
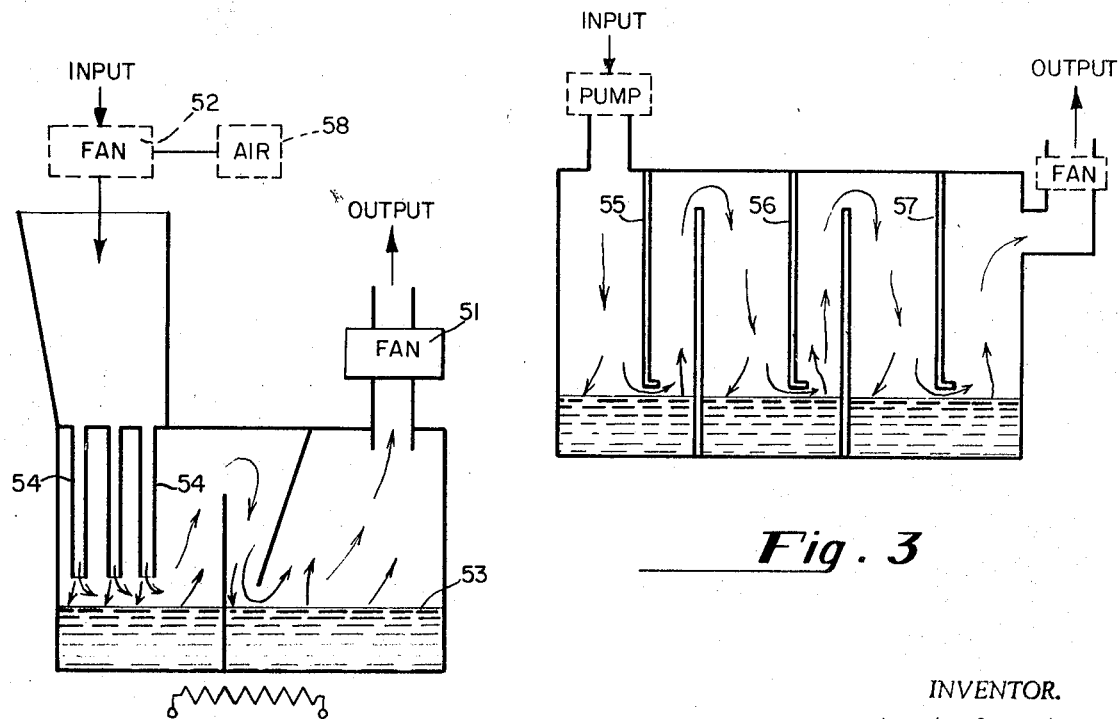
*Fig. 2*
*Fig. 3*
INVENTOR.
Jacob Greenberg
BY
Paul & Paul
ATTORNEYS.

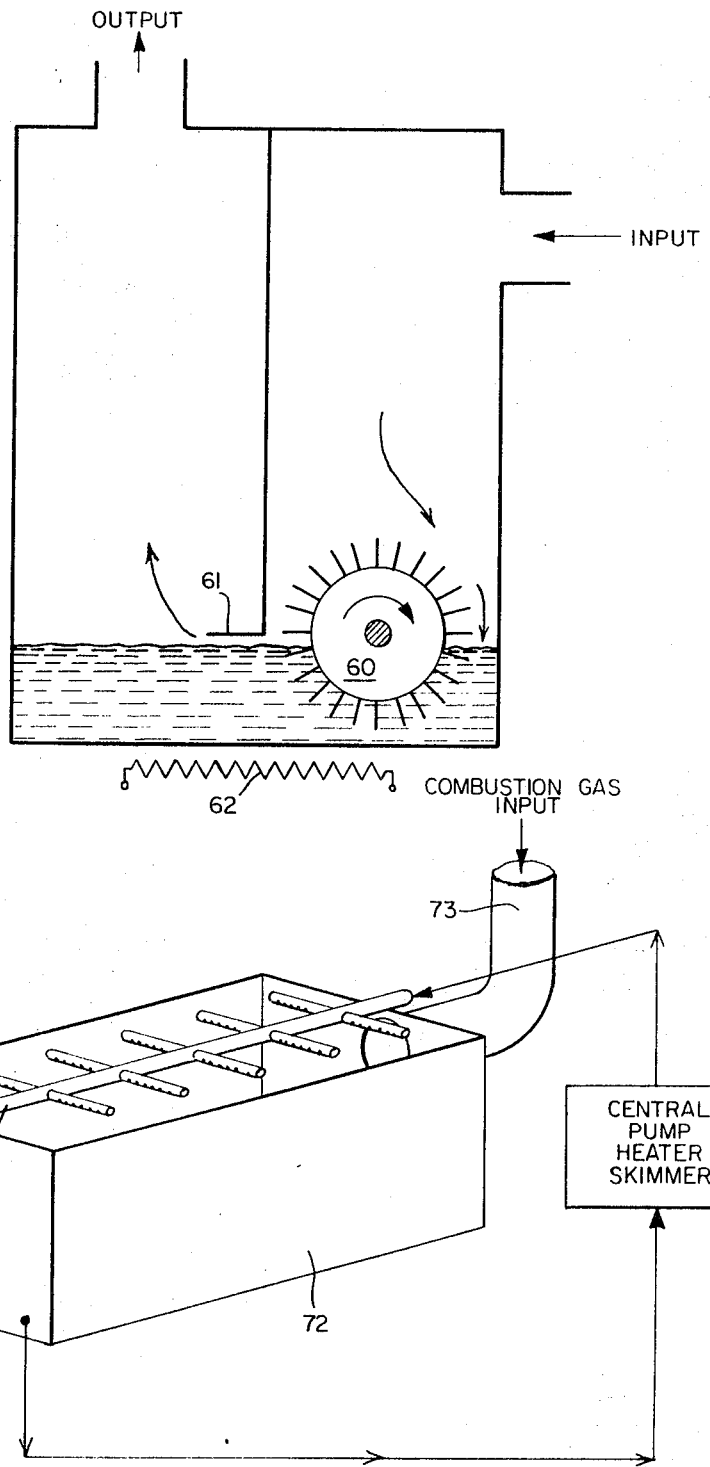

3,647,358

METHOD OF CATALYTICALLY INDUCING OXIDATION OF CARBONACEOUS MATERIALS BY THE USE OF MOLTEN SALTS

CROSS-REFERENCES TO RELATED APPLICATIONS

This is a continuation-in-part of my copending applications Ser. No. 781,495 and 781,383, both filed Dec. 5, 1968 and each now abandoned.

BACKGROUND OF THE INVENTION

1. Field of the Invention

This invention relates to catalytically induced oxidation of carbonaceous materials containing carbon, hydrocarbon or hydrocarbons, and/or carbon monoxide and, more particularly, oxidation of carbonaceous materials and carbonaceous products of incomplete combustion, by catalytic reactions induced by molten salts.

2. Description of the Prior Art

The removal of impurities such as carbon and hydrocarbons from industrial processes and other sources of air pollution is of immediate concern to every urban center in the country, and has been the subject of many previous efforts. Many attempts utilize an afterburner in one form or another, through which the effluent gases of the industrial process are passed in order to achieve more complete combustion before being discharged into the atmosphere. This process requires an expensive heat transfer system which is generally wasteful of fuel and which in turn generates exhaust gases which create further air pollution problems. At the present, the cost factor involved in the installation of such systems is prohibitive and precludes the use of conventional afterburners for most industrial and commercial applications. Another industrial technique for insuring more completeness of the oxidizing reaction is to employ expensive metal catalysts. The catalytic elements in such systems are susceptible of "poisoning" and require periodic regeneration or replacement. This type of system also is too expensive for many types of service to be commercially acceptable.

Molten salts have been utilized in several industrial applications which are quite foreign to the air pollution field, e.g., the use of molten $ZnCl_2$ for the hydrogenation of coal to form gasoline and the use of molten alkali hydroxide-alkali carbonate electrolytes in hydrogen-oxygen fuel cells. In addition, molten salts have been utilized in certain air depollution processes. For example, U.S. Pat. No. 3,438,722, entitled "Removal Of Sulfur Oxides From Flue Gas," describes the use of a molten salt bath which acts as an absorbent or chemical reactant, displacing $CO_2$ with $SO_2$.

Most industrial applications employing salts utilize molten salt baths essentially for heat transfer purposes. Molten salts at high temperatures have been used in pyrolysis applications, and in the cracking of hydrocarbons. However, to date there has been no use, and relatively no understanding, of the characteristics of molten salts at relatively low temperatures, where they act as catalysts in inducing oxidation of carbonaceous materials, e.g., gas containing pollutant species such as carbon, carbon monoxide and hydrocarbons.

OBJECTS OF THE INVENTION

It is an object of this invention to provide an efficient method of oxidizing carbonaceous materials at temperatures below which they may normally be combusted in their free state.

It is a further object of this invention to provide a method for more efficiently oxidizing waste gases containing unburned carbon, carbon monoxide, and hydrocarbons.

It is a further object of this invention to provide a method for oxidizing incomplete products of combustion at temperatures below the combustion temperature at which they were formed.

It is a further object of this invention to provide an efficient and inexpensive process for oxidation of unburned carbon monoxide and hydrocarbons contained in smokestacks and automotive exhaust systems.

It is a further object of this invention to provide a method for efficiently oxidizing vaporized organic materials.

It is a further object of this invention to provide a method for burning carbonaceous fuels such that the combustion products contain very low amounts of unburned pollutant species.

SUMMARY OF THE INVENTION

Accordingly, this invention relates to a method comprising the step of bringing carbonaceous materials, in the presence of oxygen, into contact with a molten salt which is characterized by a relatively low melting temperature and high stability with respect to the materials and air. Gaseous, liquid and solid materials, which contain carbon, hydrocarbon or hydrocarbons, and/or carbon monoxide, are referred to herein as carbonaceous materials. The molten salt has the property of catalytically inducing oxidation of the carbonaceous materials in the presence of oxygen, the oxidation being substantially complete so as to form innocuous oxidation components which are released into the atmosphere.

In one form of this invention the molten salt is essentially neutral, that is, while it catalytically induces oxidation of the carbonaceous material it does not supply oxygen or chemically react with the carbonaceous material. In this embodiment, sufficient oxygen for the catalytically induced oxidation is supplied by oxygen mixed with the incoming carbonaceous material, as where such material is a combustion gas, or by ambient air or by oxygen added to the molten salt from an external source.

In another embodiment, the molten salt may comprise a chemically oxidizing salt or mixture of such salt, or a mixture of a chemically oxidizing salt and a neutral salt, which in addition to catalytically inducing oxidation, continuously releases nascent oxygen and absorbs ambient oxygen, there being no net change in the oxygen content of the molten salt with the result that the composition of the salt remains substantially unchanged chemically. The effect of the chemically oxidizing salt is to provide an equilibrium oxygen gas pressure which facilitates oxidation.

Where the carbonaceous material consists of pollutant combustion gas, and the molten salt bath is essentially neutral, the polluted gas is introduced into a molten salt bath with an external supply of oxygen or as a mixture with air as provided in the combustion facility which produces the polluted gas. In either embodiment, utilizing a neutral salt or a chemically active salt, the apparatus with which the method is performed is designed to interface with the combustion facility, so as to maintain the output draft conditions of such combustion facility.

BRIEF DESCRIPTION OF THE DRAWINGS

FIG. 1 shows, in schematic form, the components of a gas pollution control system ideally adapted for the practice of this invention.

FIG. 2 shows schematically, in cross-sectional form, a downblast forced gas system for introduction of combustion gas into the salt bath.

FIG. 3 is a schematic representation of a bath chamber having a baffle-type construction for intermixture of the combustion gas with the molten salt.

FIG. 4 is a schematic representation of a bath chamber having a paddle-wheel-like construction for intermixture of the combustion gas with the molten salt.

FIG. 5 is a schematic representation of a spray chamber system for practice of this invention.

DETAILED DESCRIPTION OF THE INVENTION

This invention comprises a method of using molten salts to catalytically oxidize carbonaceous materials at temperatures below which such materials are normally oxidized. The nature of the molten salts employed is such that relatively complete oxidation is achieved at relatively low temperatures, without the production of unburned products that generally result from combustion of such materials.

It is known that neutral, i.e., noncharged materials including metals and elements such as sulfur and chlorine are soluble in molten salts. This solubility is related to the ionic, or crystal-like structure of the salts, which are quasi-lattice in nature. X-ray data at temperatures above the melting point of molten salts disclose actual crystallike lattice structures. The solubility activity of the molten salt may be explained by observing that the solute, or inert material, assumes an electrostatic charge which gives it a similar electrostatic orientation as the ionic components of the molten salt. Unburned products of combustion, such as carbon, carbon monoxide and hydrocarbons, require a high activation energy in order to be chemically activated and to be oxidized. When such pollutant species are introduced into a molten salt bath or brought into contact with it, the bath induces charge orientations that are similar to the ionic charges of the salt. The process of so polarizing, or orienting, the normally neutral species results in a reduction of the energy required to initiate and to sustain the chemical reactions. Under such conditions the neutral species, when exposed to oxygen, have been found to oxidize at temperatures that are substantially lower than those normally necessary for oxidation in the free gas state. This catalytic property of the molten salts, in reducing the energy and the temperature required to oxidize carbonaceous materials such as unburned neutral pollutants, while remaining substantially chemically unchanged during the oxidation, forms an important basis for the method of this invention which is described and claimed hereinafter.

Referring now to FIG. 1, apparatus is shown in schematic form for obtaining catalytically induced oxidation of combustion gases. The pollutant-containing combustion gas is introduced through an inlet 32 at a pressure which is sufficient such that the draft conditions of the combustion chamber, from which it came, are not disturbed. If necessary, a pump 30 may be provided to achieve a proper interface with the combustion chamber. The combustion gas normally contains a sufficient proportion of oxygen. For example, when the combustion takes place in a power plant where fuel is burned in the presence of air, the stack gases contain a proportion of oxygen which varies with the amount of air introduced into the combustion chamber, as well as with the degree of oxidation within the chamber. If desired, oxygen may be introduced into the bath from a separate source 48.

It is to be noted that oxygen may be introduced into the salt electrolytically. For example, conventional electrolysis may be employed with a nitrate bath, with oxygen being produced at the positive electrode as a result of decomposition of nitrate anions. Further, while the oxidation reactions most often referred to in this patent are the combination of oxygen with carbon, carbon monoxide and/or hydrocarbons, it is also noted that, in broader terms, oxidation could occur by combination with chlorine or other similar gases, to produce innocuous oxidation products.

A molten salt bath 31, the composition of which is discussed in detail hereinbelow, is provided in a container 37 constructed of a suitably noncorrosive material, the molten salt bath filling the container to a level indicated at 44. In the embodiment shown in FIG. 1, inlet 32 carrying the gases of combustion extends below level 44, the combustion gas passing through a filter 35 and into the molten liquid, where the desired catalytically induced oxidation takes place. Filter 35 is designed both to catch certain particulate matter such as fly ash and other solids, and to disperse the combustion gas into the liquid. The oxidized combustion gas evolves from the molten salt bath and is drawn through outlet 36 by conventional blower or fan 45 which, by itself or in combination with pump 30, maintains a sufficient pressure differential from input to output to overcome the pressure head presented by the salt bath.

In some applications of the process of this invention, as in an automotive exhaust system discussed hereinafter, the heat of the incoming combustion gas is sufficient to maintain the salt bath in a molten form and at a desired temperature. The catalytic nature of the bath insures that oxidation takes place at a temperature below the combustion temperature at which the combustion gas is produced and, accordingly, in many instances the heat transfer from the combustion gas to the bath is sufficient to maintain it at the desired temperature. Further, the oxidation reactions which take place in the bath are generally exothermic, such that the bath temperature may rise above the temperature which would be maintained solely by heat transfer from the combustion gas.

In some applications, the temperature of the bath rises excessively unless the feed rate of combustion gas is properly controlled. However, in most applications involving power plant stack gases, automotive exhaust and the like, the feed rate is well within the desired limits, obviating the need for any feed control mechanism. In some applications, however, it is necessary or desirable to provide the bath with an external source of heat, as through a conventional heat source 38. Heat source 38 may be in the form of conventional electrical heating coils immersed within the bath, or a conventional flame source (burner) located below and external to the bath container 37.

In the practice of this invention some residue is sometimes formed, which may be removed by a conventional skimmer device 39. Also, certain products settle to the bottom of the bath from time to time; they may be removed by conventional dredging apparatus 40.

The incoming combustion gas normally contains a variety of noxious or harmful ingredients which are present because of incomplete combustion. In the process of this invention, unburned carbon, carbon monoxide, and hydrocarbons are oxidized in the presence of the molten salt. These have the general property that they require a high activation energy in order to render them chemically active so that they can be oxidized. These materials have a finite solubility in molten salts and, in the presence of such salts, oxidize at lower energy levels and lower temperatures than normally required, and require only a very short reaction time. For example, the smoke content of unburned hydrocarbon and carbon monoxide resulting from flame incineration of plastics, specifically polystyrene and polyvinylchloride, as well as wood and coal, at 1,500° F., was reduced by at least 90 percent when passed into a nitrate-nitrite bath at 550° F. This result of oxidizing CO to $CO_2$, and hydrocarbons to $CO_2$ and $H_2O$, at almost one-third the flame temperature, while the bath remained substantially unchanged in its composition, indicated that neither heat transfer nor displacement reactions were involved to any appreciable degree, but that the bath exhibited a catalytic property in inducing oxidation of the pollutants.

The salt bath, therefore, is seen to be a uniquely effective medium in which to carry out oxidation reactions involving lower activation energies. The bath is stable in that it possesses the characteristics of a sharp melting point and does not undergo any substantial change in chemical composition in the presence of ambient air, water vapor, or carbonaceous materials which are brought into contact with it. The partial pressure, or the vapor pressure above the liquid surface, is minimal and within about 20 millimeters of mercury at operating temperatures, i.e., approximately 200° F. above the melting point.

In the practice of this invention, the molten salt is maintained at a relatively low temperature, affording considerable savings in energy requirements. For many applications, salt temperatures below 450° C. are adequate for substantially complete oxidation of all carbonaceous material present. It is to be noted that where the oxidation reactions are exothermic, there will exist localized temperatures, at or near the surface of the salt, in excess of the average temperature of the bath. If the salt has a melting point above 600° C., or about 1,100° F., and the salt is maintained about 200° F. above its melting point, or above 1,300° F., these temperatures are sufficient to oxidize many carbonaceous materials in their free state and, accordingly, for such materials the salt operates primarily as a heat transfer medium. At such temperatures the salt still maintains its crystallike structure, as discussed hereinbefore, and, accordingly, still acts as a catalyst. However, as considerable combustion of many carbonaceous materials would normally take place at temperatures above 1,300° F., this is an effective economical upper operating bath temperature for carrying out many of the catalytically induced oxidation reactions of this invention. It is to be noted that carbon, by itself, does not readily oxidize when introduced into a bath having a temperature of 1,300° F. or less. However, when hydrocarbons or other high energy yield carbonaceous materials are present, these oxidize at much lower temperatures, and the resulting energy release generates sufficient additional localized heat to oxidize carbon in the area. Thus, baths operated at temperatures of 1,300° F. and below do efficiently oxidize carbon when sufficient carbonaceous fuel is also present and oxidized, as illustrated in the examples presented hereinafter. Further, oxidation of carbon alone is catalytically introduced in the presence of molten salt, at temperatures above 1,300° F. but below the normal oxidation temperature of carbon.

The lower end of the applicable bath temperature range is limited only by the melting point of the salt (or mixture of salts) comprising the bath. A lower temperature range of 50° C. can be achieved by selecting materials such as salts with mixtures containing thallium salts, e.g., $TINO_3$, 50 M%—$AgNO_3$, 50 M%, (M% designating mole % throughout), which is useful where low-temperature oxidation is required.

It should be emphasized that, in the practice of this invention the molten salt does not directly react with the unburned products of combustion, in that the salt does not undergo any substantial change in chemical composition due to the oxidation of carbonaceous materials. Rather, the molten salt acts primarily as a catalyst in lowering the heat energy which must be supplied to carry out the oxidation of such products. It secondarily acts as a heat transfer medium to keep the gas at a high temperature and also serves as a medium in which oxygen is made available in order to complete the combustion process. For example, where the material is a combustion gas, the gas introduced may be of an acidic or basic nature and in either case is activated by its presence in contact with the molten salt to combine with oxygen. The salt acts as a catalyst, and does not take part in any net displacement reactions with the pollutant species, and accordingly the oxidation process is carried out without need for regeneration of the salt bath, except where no oxygen is available externally of the salt. Normally, sufficient oxygen will be introduced with the carbonaceous material so that the salt bath may be used indefinitely without need for regeneration. In the extreme case where insufficient oxygen is introduced and insufficient ambient oxygen is available, an external oxygen source 48 may be used.

The salts which are usable according to this invention are stable in the temperature range required for combustion of the pollutant materials, and remain substantially chemically unchanged during the oxidation reaction. A first class of such salts which are usable are the neutral salts. A single neutral salt, or mixtures of such salts, may be utilized. Eutectic mixtures, having a lowest melting temperature, are preferred as they provide the greatest efficiency of operation at low temperatures. A second class of usable salts is that of chemically active salts, treated at a later point in this specification.

With respect to the first class of salts, any of the metallic halides having melting temperatures in the desired range of 50° C. to 600° C. are useful as molten salt baths. The chlorides, for example, are very stable and consequently are preferred baths. A representative list of some neutral baths which may be used in this invention is included below. The temperatures given represent the melting point of the bath, and are accurate to within plus or minus 10° C.; the compositions are accurate to within 10 percent.

The following are examples of eutectic mixtures of neutral salts which can be used in this invention, where M equals Mole throughout:

Mixtures with KCl
    41 M% KCl—59 M% LiCl    358° C.
    57 M% KCl—43 M% BaCl$_2$    345° C.
    60 M% KCl—40 M% CaCl$_2$    580° C.
    35 M% KCl—65 M% CdCl$_2$    380° C.
    40 M% KCl—60 M% MgCl$_2$    420° C.
    55 M% KCl—45 M% SrCl$_2$    575° C.
    50 M% KCl—50 M% MnCl$_2$    500° C.
    48 M% KCl—52 M% PbCl$_2$    411° C.
    45 M% KCl—55 M% ZnCl$_2$    230° C.

Mixtures with LiCl
    72 M% LiCl—28 M% NaCl    560° C.
    28 M% LiCl—62 M% CaCl$_2$    496° C.
    45 M% LiCl—55 M% MnCl$_2$    550° C.
    45 M% LiCl—55 M% PbCl$_2$    410° C.
    45 M% LiCl—55 M% SrCl$_2$    475° C.

Mixtures with NaCl
    33 M% NaCl—67 M% CaCl$_2$    550° C.
    42 M% NaCl—58 M% CdCl$_2$    397° C.
    48 M% NaCl—52 M% CoCl$_2$    365° C.
    60 M% NaCl—40 M% MgCl$_2$    450° C.
    55 M% NaCl—45 M% MnCl$_2$    415° C.
    45 M% NaCl—55 M% NiCl$_2$    560° C.
    28 M% NaCl—72 M% PbCl$_2$    415° C.
    50 M% NaCl—50 M% SrCl$_2$    560° C.

Mixtures with BaCl$_2$
    12 M% BaCl$_2$—88 M% BeCl$_2$    390° C.
    30 M% BaCl$_2$—70 M% CaCl$_2$    600° C.
    45 M% BaCl$_2$—55 M% CdCl$_2$    450° C.
    35 M% BaCl$_2$—65 M% MgCl$_2$    560° C.
    35 M% BaCl$_2$—65 M% MnCl$_2$    500° C.
    50 M% BaCl$_2$—50 M% ZnCl$_2$    500° C.

Mixtures with CaCl$_2$
    47 M% CaCl$_2$—63 M% MnCl$_2$    600° C.
    18 M% CaCl$_2$—82 M% PbCl$_2$    470° C.
    50 M% CaCl$_2$—50 M% ZnCl$_2$    600° C.

Mixtures with CdCl$_2$
    50 M% CdCl$_2$—50 M% MnCl$_2$    600° C.
    35 M% CdCl$_2$—65 M% PbCl$_2$    387° C.
    60 M% CdCl$_2$—40 M% SrCl$_2$    500° C.
    50 M% CdCl$_2$—50 M% ZnCl$_2$    500° C.

Mixtures with ZnCl$_2$
    38 M% ZnCl$_2$—62 M% SnCl$_2$    180° C.
    45 M% ZnCl$_2$—55 M% SrCl$_2$    480° C.

Mixtures with MgCl$_2$
    8 M% MgCl$_2$—92 M% PbCl$_2$    460° C.
    55 M% MgCl$_2$—45 M% SrCl$_2$    530° C.

Mixtures with PbCl$_2$
    20 M% BaCl$_2$—80 M% PbCl$_2$    505° C.
    48 M% BeCl$_2$—52 M% PbCl$_2$    300° C.
    90 M% BiCl$_2$—10 M% PbCl$_2$    205° C.
    18 M% CaCl$_2$—82 M% PbCl$_2$    460° C.
    35 M% CdCl$_2$—65 M% PbCl$_2$    387° C.
    33 M% CuCl—67 M% PbCl$_2$    285° C.
    50 M% FeCl$_3$—50 M% PbCl$_2$    185° C.
    48 M% KCl—52 M% PbCl$_2$    411° C.
    45 M% LiCl—55 M% PbCl$_2$ tn 410° C.
    8 M% MgCl$_2$—92 M% PbCl$_2$    450° C.
    30 M% MnCl$_2$—70 M% PbCl$_2$    405° C.
    28 M% NaCl—72 M% PbCl$_2$    415° C.
    72 M% PbF$_2$—28 M% PbCl$_2$    550° C.
    76 M% PbI$_2$—24 M% PbCl$_2$    310° C.
    50 M% SnCl$_2$—50 M% PbCl$_2$    410° C.
    60 M% TlCl—40 M% PbCl$_2$    390° C.
    50 M% ZnCl$_2$—50 M% PbCl$_2$    340° C.

Mixtures with 3 Chlorides
    35 M% PbCl$_2$—35 M% Kcl—30 M% CdCl$_2$    328° C.
    60 M% Kcl—20 M% PbCl$_2$—20 M% NaCl    500° C.
    10 M% PbCl$_2$—50 M% KCl—40 M% ZnCl$_2$    280° C.
    10 M% NaCl—40 M% LiCl—50 M% KCl    400° C.
    70 M% LiCl—15 M% CaCl$_2$—15 M% KCl    450° C.
    30 M% BaCl$_2$—35 M% KCl—35 M% NaCl    542° C.
    10 M% NaCl—35 M% CaCl$_2$—55 M% KCl    600° C.
    15 M% NaCl—50 M% CdCl$_2$—35 M% KCl    450° C.
    10 M% NaCl—15 M% PbCl$_2$—75 M% KCl    500° C.

Mixtures with KBr
    31 M% KBr—69 M% LiBr    310° C.
    60 M% KBr—40 M% CdBr$_2$    325° C.
    32 M% KBr—68 M% MgBr$_2$    350° C.
    50 M% KBr—50 M% SrBr$_2$    525° C.

Mixtures with NaBr
    40 M% BaBr$_2$—60 M% NaBr    600° C.

| | |
|---|---|
| 60 M% CaBr₂—40 M% NaBr | 510° C. |
| 45 M% CdBr₂—55 M% NaBr | 370° C. |
| 40 M% MgBr₂—60 M% NaBr | 425° C. |
| 60 M% SrBr₂—40 M% NaBr | 480° C. |

Mixtures with LiBr

| | |
|---|---|
| 80 M% LiBr—20 M% NaBr | 525° C. |
| 75 M% LiBr—25 M% BaBr₂ | 485° C. |
| 32 M% LiBr—68 M% SrBr₂ | 460° C. |

Mixtures with PbBr₂

| | |
|---|---|
| 80 M% BiBr₃—20 M% PbBr₂ | 200° C. |
| 18 M% CdBr₂—82 M% PbBr₂ | 344° C. |
| 90 M% HgBr₂—10 M% PbBr₂ | 208° C. |
| 50 M% PbCl₂—50 M% PbBr₂ | 425° C. |
| 78 M% PbF₂—22 M% PbBr₂ | 520° C. |
| 10 M% PbF₂—90 M% PbBr₂ | 350° C. |
| 44 M% PbI₂—56 M% PbBr₂ | 282° C. |

Mixtures with 3 bromides

| | |
|---|---|
| 12.5 M% NaBr—12.5 M% CdBr₂—75 M% PbBr₂ | 280° C. |
| 65 M% PbI₂—18 M% PbCl₂—17 M% PbBr₂ | 300° C. |

Mixtures with 4 Salts

| | |
|---|---|
| 25 M% ClCl₂—25 M% CdBr₂—25 M% PbCl₂—25 M% PbBr₂ | 450° C. |
| 10 M% NaCl—10 M% NaBr—60 M% PbCl₂—20 M% PbBr₂ | 450° C. |
| 10 M% NaCl—10 M% NaI—40 M% PbCl₂—40 M% PbI₂ | 365° C. |

In addition, any neutral salt having a melting temperature of less than 600° C. may be used by itself, e.g., LiBr (547° C.), LiI (446° C.), and CaI₂ (575° C.). It is also reemphasized that other than eutectic mixtures can be used, the eutectic mixtures being preferred but not exclusive.

The above list is representative but not an exclusive listing of neutral salts which can be used in this invention. The chlorides form preferred mixtures as they provide a very stable bath at a reasonable temperature. Other baths are chosen depending upon the content of the carbonaceous material, and the temperature required for the desired degree of oxidation. It will be understood that various combinations of the salts which have been herein described may be made by those skilled in the art within the principle and scope of the invention as expressed in the claims.

In the practice of this invention with neutral molten salts, the basic process is that of catalytically induced oxidation of the material, e.g., pollutant species, by oxygen supplied from the combustion source, e.g., flue gas, supplied externally, or by the surrounding air. As an alternate embodiment, the equilibrium pressure of oxygen gas within and at the surface of the salt may be enhanced by utilizing a chemically oxidizing salt or salts, i.e., an active salt. In a bath comprised of such a chemically active salt, the bath continuously gives up nascent oxygen and retakes oxygen from without the bath, thereby maintaining a partial decomposition pressure of oxygen gas. However, as in the case of the neutral bath, the chemical composition of molten salt remains substantially unchanged during the oxidation process. While, in the oxidation process, the chemically active bath continuously gives up nascent oxygen, it concurrently also retakes oxygen from without, such that there is no net change in its chemical composition. For example, the molecules of an oxidizer such as a nitrate yield oxygen, but are in turn continuously replenished to maintain their original form, either from the oxygen introduced with the gas of combustion or from some other oxygen source such as the oxygen in the air surrounding the bath container.

Thus, in the practice of this invention utilizing molten chemically active salts, the bath acts as a catalyst in reducing the amount of energy that is necessary to carry out oxidation, keeps the gas at an elevated temperature, and also acts to enhance the availability of the oxygen which is needed to complete the combustion process. So long as the bath is not sealed off from the atmosphere or some oxygen is available to reoxidize the oxidizing agents, there is no need to replenish the bath. While it is possible that the supply of oxygen in the bath could be exhausted, necessitating external introduction of oxygen to reoxidize the oxidizing agents, as a practical matter such a replenishment step has not normally been found to be required with the use of the chemically active salts.

A partial list of some of the chemically active oxidizers which may be used in this invention is included below. The temperatures given represent the lowest temperature at which the melt may be used, and are accurate to within 5° C. to 10° C.; M% again indicates Mole percentage, accurate to within 10 percent. It is to be understood that this list is representative of the chemically active systems which can be used in this invention but is not an exclusive list. Any stable combination of active salts, or neutral and active salts, can be employed in the practice of this invention. For example, $K_2CrO_4$, $K_2Cr_2O_7$, PbO and $U_2O_5$ may, in various combinations, be mixed with KCl or LiCl.

CHEMICAL OXIDIZERS

Oxides

| | |
|---|---|
| 2 M% K₂CrO₄—98 M% K₂Cr₂O₇ | 398° C. |
| 45 M% MoO₃—55 M% K₂MoO₄ | 470° C. |
| 43 M% WO₃—57 M% K₂WO₄ | 600° C. |
| 47 M% MoO₃—53 M% Li₂MoO₄ | 530° C. |
| 45 M% 3Na₂O·As₂O₅—55 M% As₂O₅ | 570° C. |
| 77 M% MoO₃—33 M% Na₂MoO₄ | 510° C. |
| 58 M% 3Na₂O·P₂O₅—42 M% Na₂O·P₂O₅ | 552° C. |
| 38 M% WO₃—62 M% Rb₂WO₄ | 570° C. |
| 8 M% CaO—92 M% P₂O₅ | 409° C. |
| 50 M% PbO—50 M% V₂O₅ | 480° C. |

Three Oxides

| | |
|---|---|
| 37 M% K₂MO₄(=K₂O+MoO₃)—63 M% Li₂MoO₄ | 525° C. |
| 50 M% KPO₃—50 M% LiPO₃ (consists of K₂O,Li₂O,P₂O₅) | 562° C. |
| 49 M% NaPO₃—49 M% KPO₃—2 M% K₂O | 547° C. |
| 50 M% Li₂MoO₄—50 M% Na₂MoO₄ | 465° C. |
| 50 M% Na₂WO₄—50 M% Li₂WO₄ | 500° C. |
| 50 M% Pb₂SiO₄—50 M% Na₂SiO₃ | 600° C. |
| 33 M% Na₂O·SiO₂—67 M% PbO·SiO₂ | 580° C. |

Perchlorates

| | |
|---|---|
| 70 M% LiClO₄—30 M% NH₄ClO₄ | 185° C. |
| 40 M% NaClO₄—60 M% Ba(ClO₄)₂ | 305° C. |

Hydroxides

| | |
|---|---|
| 50 M% NaNO₂—50 M% NaOH | 270° C. |
| 50 M% KNO₂—50 M% KOH | 200° C. |
| 50 M% KOH—50 M% KNO₃ | 235° C. |
| 70 M% KOH—30 M% LiOH | 110° C. |
| 50 M% KOH—50 M% KNO₃ | 240° C. |
| 50 M% KOH—50 M% NaOH | 170° C. |
| 15 M% K₂CrO₄—85 M% KOH | 361° C. |
| 70 M% NaOH—30 M% LiOH | 210° C. |
| 50 M% NaOH—50 M% NaNO₂ | 266° C. |
| 50 M% KNO₃—50 M% NaOH | 330° C. |
| 62 M% Ba(OH)₂—38 M% Sr(OH)₂ | 360° C. |
| 30 M% KOH—30 M% NaOH—40 M% LiOH | 300° C. |
| 33 M% NaOH—34 M% Na₂SO₄—33 M% NaCl | 500° C. |
| 25 M% LiOH—25 M% NaOH—25 M% Li₂CrO₄—25 M% Na₂CrO₄ | 475° C. |
| 25 M% LiOH—25 M% NaOH—25 M% LiNO₃—25 M% NaNO₃ | 400° C. |

Nitrates

| | |
|---|---|
| 50 M% KNO₃—50 M% NaNO₃ | 222° C. |
| 35 M% KNO₃—65 M% TlNO₃ | 185° C. |
| 85 M% KNO₃—15 M% Ba(NO₃)₂ | 280° C. |
| 50 M% Ca(NO₃)₂—50 M% NaNO₃ | 240° C. |
| 50 M% Ca(NO₃)₂—50 M% KNO₃ | 240° C. |
| 50 M% LiNO₃—50 M% Ba(NO₃)₂ | 400° C. |
| 70 M% LiNO₃—30 M% Ca(NO₃)₂ | 240° C. |
| 50 M% Ba(NO₃)₂—50 M% Ca(NO₃)₂ | 520° C. |
| 60 M% Tl(NO₃)₂—40 M% Ca(NO₃)₂ | 140° C. |
| 40 M% KNO₃—35 M% LiNO₃—25 M% NaNO₃ | 130° C. |
| 60 M% KNO₃—25 M% LiNO₃—15 M% Ca(NO₃)₂ | 130° C. |
| 60 M% KNO₃—25 M% LiNO₃—15 M% Ca(NO₃)₂ | 125° C. |
| 20 M% LiNO₃—60 M% Cd(NO₃)₂—20 M% KNO₃ | 140° C. |

| | |
|---|---|
| 34 M% Ba(NO₃)₂—33 M% KNO₃—33 M% NaNO₃ | 450° C. |
| 34 M% Ca(NO₃)₂—33 M% KNO₃—33 M% NaNO₃ | 140° C. |
| 34 M% Cd(NO₃)₂—33 M% NaNO₃—33 M% LiNO₃ | 176° C. |
| 5 M% Na₂SO₄—95 M% NaNO₃ | 300° C. |

Nitrites

| | |
|---|---|
| 70 M% NaNO₂—30 M% KNO₂ | 230° C. |

Nitrates-Nitrites

| | |
|---|---|
| 50 M% KNO₂—50 M% KNO₃ | 350° C. |
| 62 M% KNO₃—38 M% Ca(NO₃)₂ | 140° C. |
| 50 M% NaNO₂—50 M% KNO₃ | 150° C. |
| 50 M% NaNO₂—50 M% NaNO₃ | 230° C. |
| 50 M% NaNO₂—50 M% Ca(NO₃)₂ | 190° C. |
| 25 M% KNO₂—25 M% NaNO₂—25 M% KNO₃—25 M% NaNO₃ | 150° C. |
| 25 M% KNO₂—25 M% Ba(NO₂)₂—25 M% KNO₃— | |
| 25 M% Ba(NO₃)₂ | 300° C. |

Sulfates

| | |
|---|---|
| 60 M% K₂SO₄—40 M% CoSO₄ | 540° C. |
| 55 M% K₂SO₄—45 M% CuSO₄ | 460° C. |
| 55 M% Li₂SO₄—45 M% CdSO₄ | 575° C. |
| 60 M% Li₂SO₄—40 M% CoSO₄ | 600° C. |
| 35 M% MnSO₄—65 M% Li₂SO₄ | 600° C. |
| 50 M% Na₂SO₄—50 M% CoSO₄ | 600° C. |
| 55 M% Na₂SO₄—45 M% CuSO₄ | 500° C. |
| 50 M% ZnSO₄—50 M% Na₂SO₄ | 500° C. |

Sulfate Mixtures

| | |
|---|---|
| 33 M% K₂SO₄—67 M% Li(PO₃)₂ | 470° C. |
| 25 M% K₂SO₄—25 M% Li₂SO₄—25 M% KNO₃—25 M% LiNO₃ | 460° C. |
| 25 M% K₂SO₄—25 M% Li₂SO₄—25 M% K₂WO₄—25 M% Li₂WO₄ | 570° C. |
| 25 M% Li₂SO₄—25 M% Na₂SO₄—25 M% Li₂MoO₄—25 M% Na₂MoO₄ | 520° C. |

It is to be noted that some of the above mixtures are combinations of neutral and active salts, as defined hereinabove. It is again emphasized that these lists are illustrative, and not limiting. Any combinations of neutral and active salts, eutectic or noneutectic, may be utilized.

The mixtures of oxidizing salts may be utilized to provide low melting baths, generally of lower melting temperatures than the neutral baths. Also, the mixtures act to improve the normal oxygen-releasing characteristics of the salts. For example, in the mixture of nitrites and nitrates, the nitrite has a tendency to cause the nitrate to release its oxygen more readily.

In the practice of the method of this invention, the composition and operating temperature of the bath is largely determined by the composition and heat content of the carbonaceous material which is to be oxidized. For example, automotive exhaust gas coming from the automobile combustion chamber is at a temperature of about 600° F., which is sufficient to melt a low melting point bath without external heating. Accordingly, a nitrate oxidizing bath is preferably chosen, which is maintained at a temperature of approximately 750° F., or about 365° C., due to the exothermic nature of the oxidation reaction. While the neutral salt baths may be used at temperatures immediately above their melting points, the oxidizing salt baths are normally used at temperatures approximately 200° F. above their melting points in order to obtain good oxygen release.

It has been determined that the oxidizing baths assume a neutral, or inert state at temperatures below approximately 200° F. above the melting point. In such state, they do not possess the property of releasing nascent oxygen, but behave catalytically as do the neutral salts. Such oxidizing salts may be used as inert baths at the lower temperatures to avoid extreme temperature rises which may occur with highly inflammable materials. Since the molten neutral salt baths are operated generally at higher temperatures, the use of the oxidizing baths, in the neutral or inert temperature range, permits operation at temperatures where the exothermic reactions will not be in danger of producing an explosive situation.

The molten salt baths described in this invention induce very quick oxidizing reactions of carbonaceous pollutants when they are brought into effective contact with one of the baths. Theoretical reaction times are of the order of milliseconds. However, the efficiency of the method is a function of the salt-pollutant intermix, with an intermix time within the range of 0.01 to 0.1 second providing high efficiency. It is thus desirable to intermix, or contact, the carbonaceous material, or pollutant, and oxygen with the molten bath, and this can be done in a variety of ways. In the technique shown diagrammatically in FIG. 1, the gas is forced under pressure into the molten bath where it makes immediate contact. Alternately, the gas may be brought into contact solely with the surface of the molten salt, this being sufficient intermixture of the gas and the bath to catalytically induce oxidation. It is to be noted that bringing the gas into contact with the salt surface involves a degree of intermixing. The gas, under pressure, agitates the salt surface, the agitation acting to churn the gas into the salt. The released energy due to the oxidation enhances this churning effect.

Apparatus for contacting combustion gas with the bath in this latter manner is shown in FIGS. 2 and 3. FIG. 2 shows a downblast forced system, where the gas is forced, under pressure produced by a negative pressure fan 51 and/or a positive pressure fan 52, against the surface 53 of the molten bath. The venturi tubes 54 act to increase the velocity with which the gas strikes the surface, increasing the amount of intermixing. FIG. 3 shows a baffled bath container causing the combustion gas to be swept into contact with the surface of the bath several times, e.g., as it is drawn beneath baffles 55, 56 and 57.

In order to achieve greater contact between the gas and the salt bath, a stirring mechanism or paddle wheel apparatus 60, as shown in FIG. 4, may be employed. The paddle wheel has the effect of churning the gas into the bath and beneath baffle 61, thereby insuring intermixing and close contact.

FIG. 5 is a schematic diagram of a spray chamber system which may be used advantageously in the practice of this invention. The molten liquid is heated in and circulated to and from a central heating and pumping housing 70 to a number of spray units, only one of which is shown in FIG. 5. The molten salt is sprayed through a spraying mechanism 71 located in a chamber 72, which chamber normally is enclosed to prevent splashing. The combustion gas is introduced at inlet 73, intermixes with the spray within chamber 72, and exits through outlet 74. A pressure differential is maintained between inlet and outlet, to regulate the gas flow rate. In addition to the normal scrubbing effect of a spray chamber, the spray increases the exposed surface area of the molten salt and thereby enhances the catalytic effect of the salt on the oxidation of the carbon, carbon monoxide and hydrocarbons in the gas.

The method of this invention may be practiced for the efficient combustion of liquid and solid fuels, as well as for the oxidation of noxious carbonaceous species in vapors. Wood, coal, other conventional solid fuels, and solid plastics have been combusted by placing them directly into molten salt baths, with relatively complete oxidation of the carbon monoxide and hydrocarbons normally produced in the combustion of these materials. The resulting combustion gas may be drawn into a second chamber and again contacted with the molten bath to further oxidize remaining carbonaceous pollutants. Conventional liquid fuels such as propane, kerosene, crude oil, etc., may be combusted at temperatures below their normal combustion temperatures by introducing them onto the surface of or otherwise bringing them into contact with a molten salt. Conventional gaseous fuels, such as natural gas can be similarly combusted by introduction into contact with a molten salt. Other applications for which the method of this invention may be used for control of air pollution include, but are not limited to the following:

a. oxidation of paint spray vapors;
b. oxidation of fiber glass production exhausts;

c. oxidation of solvent extraction from lithographical processes;
d. oxidation of petrochemical fumes;
e. oxidation of gases for odor removal;
f. oxidation of gases resulting from cooking operations;
g. oxidation of gases resulting from ceramic kilns.

The following examples further illustrate the invention:

EXAMPLE 1: AUTOMOTIVE EXHAUST SYSTEMS

In the purification of automotive exhaust, baffle apparatus as shown in FIG. 3 has been utilized, the automotive exhaust being introduced directly from the manifold into an adjacently located baffle chamber where it is brought into contact with the surface of the bath. The pressure at the input to the baffle chamber was maintained at about 2½ inches of water, no control of this pressure being necessary. At the output of the baffled container, no additional pressure controlling equipment is used, the gas being expelled out under a pressure of about one-half inch of water. At high automotive speeds, the input pressure is raised, causing a pressure differential from input to output of the baffle chamber of as much as 4 to 5 inches of water.

The following nitrate and nitrate-nitrite oxidizing baths were used:

Example 1(a) 50 M% $Ca(NO_3)_2$—50 M% $NaNO_3$.
Example 1(b) 50 M% $Ca(NO_3)_2$—50 M% $KNO_3$.
Example 1(c) 34 M% $Ca(NO_3)_2$—33 M% $KNO_3$—33 M% $NaNO_3$.
Example 1(d) 25 M% $NaNO_2$—25 M% $KNO_2$—25 M% $NaNO_3$—25 M% $KNO_3$.

In the tests performed, combustion took place at over 2,200° F. and the temperature of the exhaust gas when introduced to the baffle chamber was about 600° F., sufficient to melt each one of these baths without external heating. Upon introduction of the hot exhaust gas, the bath temperature rose, due to exothermic reactions, to an operating temperature in the range of 650° to 750° F.

The automotive exhaust in these four tests contained from 1½ to 2 percent carbon monoxide by volume, and 250 parts per million (p.p.m.) of hydrocarbons. In each case, the gas left the baffle chamber at a temperature above 600° F., containing 0 to 0.5 percent carbon monoxide, and with no detectable hydrocarbons. It was not necessary to provide an external source of oxygen, there being sufficient oxygen mixed with the input gas and from the ambient air. It is anticipated that in some automotive systems, additional ambient air may have to be added to insure complete oxidation, introduced into the baffle chamber by an externally mounted pump.

EXAMPLE 2: STACK GAS SYSTEM

Effluent smoke from an incinerator was obtained by separately burning anthracite coal, bituminous coal, tar paper, garbage residues and oil. The smoke from each of these fuels was purified by the method of this invention utilizing the paddle wheel apparatus illustrated in FIG. 4. This apparatus maintains the natural draft incinerator conditions and, due to the action of the paddle wheel in churning the stack gas into the bath, no critical pressure conditions are necessary. In operation of the experiment, a pressure drop of the stack gas was observed ranging from one-half inch to 2 inches of water from input to output.

The bath used in these tests was a mixture of sodium nitrite and potassium nitrate, 50 M% $NaNO_2$—50 M% $KNO_3$, having a melting temperature of 150° C. The operating temperature of the bath was maintained at about 600° F., with heat supplied externally to the bath by a gas open flame heater 62, as indicated diagrammatically in FIG. 4. Combustion in the incinerator took place at an open flame temperature in the range of 1,200° to 1,500° F., and the smoke coming into the chamber had a temperature in the range of 150° to 250° F., dependent upon which of the above mentioned fuels was being burned.

The stack smoke contained approximately 100 p.p.m. of carbon monoxide and 200 to 300 p.p.m. of hydrocarbons, no detectable carbon. At the output, the gas had a temperature in the range of 200° to 300° F., and contained about 10 p.p.m. CO and no detectable hydrocarbons.

EXAMPLE 3: SPRAY CHAMBER SYSTEM

Spray chamber apparatus substantially as illustrated in FIG. 5 was used for purification of typical incinerator combustion gases produced at an open flame temperature in the range of 1,200° to 1,500° F. The smoke was introduced to the spray chamber at a temperature of about 175° F. No external oxygen was added, there being sufficient ambient oxygen and oxygen contained within the smoke. The bath was comprised of 50 M% $Ca(NO_3)_2$—50 M% $NaNO_3$, having a melting temperature of 240° C., and was maintained at an operating temperature of 360° C., heat being supplied by an open flame gas heater. The spray chamber apparatus was interfaced with the incinerator so as to maintain natural draft conditions of the incinerator, and there was an observed pressure differential through the spray chamber between the input and output of the spray chamber gas within the range of one-half inch of water to 2 inches of water. The gas input, at a temperature of about 175° F. and a flow rate of about 600 c.f.m., contained an estimated 10 percent carbon by volume, 0.3 percent CO by volume, and 2 percent hydrocarbons by volume. The gas at the output had a temperature of about 250° F. and contained about 0.3 percent CO and no detectable carbon or hydrocarbons.

In the spray chamber system, the bath acts as a scrubber for physically removing inert materials, as well as for catalytically inducing oxidation. The molten salt, after being sprayed through the spray chamber, drains down into a central heater, where it is serviced by straining, skimming, dredging, etc., leaving the spray chamber essentially clean and free of pollutants.

EXAMPLE 4: DOWNBLAST FORCED GAS SYSTEM

A forces gas system as shown in FIG. 2 was used with a nitrate-nitrite bath comprised of 62 M% $KNO_2$—38 M% $Ca(NO_3)_2$, having a melting temperature of 275° F. The bath was maintained at an operating temperature of about 850° F. by an electric immersion heater. Smoke was produced by burning tar paper in an incinerator, and introduced into the system at a temperature of about 100° F., the necessary oxygen being supplied through an air intake pump 58 along with the smoke under normal operating draft conditions of the incinerator. The gas had an input pressure of about 5 inches of water and was emitted at a temperature within the range of 200° to 300° F. and at a pressure of about 1 inch of water. The gas before contact with the salt bath contained carbon particles of approximately 2 to 3 microns in diameter, and contained about 5 percent CO by volume and 5 to 10 hydrocarbons by volume. The gas output contained no carbon, and no detectable CO or hydrocarbons. The carbon particles were physically washed out and floated on the top of the bath. In small units, the carbon may be skimmed off manually; in large units a pump may be incorporated to pump the liquid through a screen to capture the solid materials.

EXAMPLE 5: SIMPLE BAFFLE NEGATIVE PRESSURE SYSTEM

Propane was introduced directly onto the surface of each of the four nitrate-nitrite baths listed in Example 1, maintained at an operating temperature in the range of 450° to 850° F. by an electric immersion heater. A simple baffle chamber with output fan, as shown in the right-hand chamber of the apparatus of FIG. 2, was utilized. A pressure differential NEUTRAL approximately one-half inch of water was maintained across the bath by the output fan. The propane, oxidized by ambient air under the catalytic influence of the bath, was entirely converted into $CO_2$ and water. It was observed that propane ignites over a nitrate-nitrite surface at 450° F. By comparison, propane will ignite over platinum at 750° F. This result demonstrates the catalytic effect of the salt with regard to inducing oxidation. The observed content of the output gas also proves the completeness of the hydrocarbon combustion.

EXAMPLE 6: NEUTRAL SALT BATHS

Example 6(a)—A bath of 57 M% KCl—43 M% $BaCl_2$ was contained in a quartz tube 24 inches long and 2 inches in diameter. The bath was maintained at an operating temperature of 350° to 400° C. by electric coils wrapped around the tube. Air, at ambient temperature and a pressure of about 5 pounds above atmosphere, was bubbled through the bath. The pollutant was provided by a hydrocarbon, crude oil, introduced onto and burned directly on the surface of the bath. A negative pressure output suction fan was utilized, establishing approximately a one pound pressure drop across the chamber. The hydrocarbon was oxidized completely and converted into $CO_2$ and water vapor, which were drawn out at a temperature of about 250° C. No hydrocarbon was detectable in the output gas. Carbon was observed initially in the form of fine particles, which were seen to eventually coagulate and settle to the bottom of the bath. This carbon residue precipitates to the bottom due to the fact that the neutral salt bath is operated at a high temperature and has a corresponding low density.

Example 6(b)—A bath of 41 M% KCl—59 M% LiCl was contained in a 24-inch test tube and maintained at an operating temperature of about 400° C. A hydrocarbon, crude oil, was placed in the bath. The other experiment variables were as described in Experiment 6(a). The gas output contained carbon dioxide and water vapor, but no detectable hydrocarbon.

It is to be noted that in the practice of this invention with many combustion gases, particulate matter remains which is relatively insoluble in the bath. Mineral matter such as aluminates, silicates, and mineral oxides which are present in the combustion gas settle to the bottom of the bath container by their own weight. Alternately, fly ash introduced into the bath floats to the top. Thus, in practice the complete operation may involve occasional skimming of the top of the bath and dredging from the bottom of the bath container.

The removal of other pollutants, such as nitrous oxides, sulfur oxides, chlorine, cyanides, phosphorus compounds, etc., may be accomplished by adding to the baths suitable conventional reacting agents, or getters. Getters acceptable for addition to the salt baths used in this invention are selected from the group consisting of: cupric oxide, sodium oxide, magnesium oxide, manganese oxide, zinc oxide, calcium oxide, barium oxide, and any other of the alkali oxides not listed hereinabove as bath constituents. It is to be noted that in this additional step, i.e., the removal of noxious gases such as nitrogen oxide and sulfur oxides by use of the getters listed above, the bath acts as a solvent in which solid precipitates are formed by conventional displacement reactions well known in the art, such displacement reactions occurring in addition to the catalytically induced oxidation.

EXAMPLE 7: ELIMINATION OF $SO_2$ FROM STACK GASES

The test of Example 2 was essentially repeated, with a lime getter added to the bath. Effluent incinerator smoke was obtained by burning wood and coal. When the fire was stabilized, after about one-half hour, $SO_2$ from a tank was introduced into the incinerator and made to pass through the flame, where it combined with the smoke. The gas was transmitted, under the natural draft conditions of the incinerator, into a paddle wheel apparatus as illustrated in FIG. 4. The salt bath contained 50 M% $NaNO_2$—50 M% $KNO_3$, to which finely powdered lime (CaO) was added. The bath temperature was maintained at about 400° F. by an external gas heater. The $SO_2$ level was measured to drop from 90 parts per million at the incinerator output to one-half part per million at the output from the salt bath, this reduction being measured throughout a three hour test. After the test, $CaSO_4$ was found at the bottom of the bath. In an analogous manner, NO or $NO_2$ in smoke will be removed as $Ca(NO_3)_2$.

I claim:
1. A method for oxidation of carbonaceous material containing substantial portions of hydrocarbon or hydrocarbons, and/or carbon monoxide, which comprises:
   a. bringing said material into contact with an ionic, inorganic molten salt in the presence of oxygen and,
   b. catalytically oxidizing said material to carbon dioxide and water by said molten salt without substantial change in the chemical composition of the salt.
2. The method defined in claim 1, wherein said material is a gas.
3. The method defined in claim 1, wherein said material is a liquid.
4. The method defined in claim 2, wherein said gas is a combination gas containing unburned carbonaceous pollutants.
5. The method defined in claim 4 wherein said molten salt is in the form of a molten salt bath.
6. The method defined in claim 3 wherein said liquid is a carbonaceous fuel.
7. The method defined in claim 1 wherein said material is a vapor containing carbonaceous materials.
8. The method defined in claim 6 wherein the oxidation products of said oxidized fuel are again brought into contact with said molten salt in the presence of oxygen.
9. A method of purification of combustion gas containing pollutants selected from the group consisting of carbon monoxide, hydrocarbons and mixtures thereof, comprising:
   a. heating a stable salt bath comprising an ionic, inorganic salt, and maintaining it in molten form at a temperature above its melting point; and
   b. contacting said gas with said molten salt, in the presence of oxygen, catalytically inducing oxidation of said pollutants to carbon dioxide and water while substantially maintaining the chemical composition of said molten bath.
10. The method defined in claim 9 wherein said molten salt is in the form of a molten salt bath which is maintained at a temperature below the normal combustion temperature of said pollutants in said combustion gas.
11. The method defined in claim 10 wherein fuel is burned in a combustion chamber at a combustion temperature and thereby produces said gas containing said pollutants, and wherein said molten salt bath is maintained at a temperature below said combustion temperature, and wherein said gas, having reduced amounts of said pollutants, is discharged.
12. In the method defined in claim 11, the step comprising maintaining said molten bath at a temperature of about 200° F. above the melting point of said bath.
13. In the method defined in claim 11, the step comprising mixing said gas with oxygen prior to contacting said gas with said bath.
14. The method defined in claim 11 wherein said oxygen is ambient oxygen.
15. The method defined in claim 11 wherein said combustion gas is automotive exhaust gas and said salt bath is a nitrate oxidizing bath.
16. The method defined in claim 15 wherein said automotive exhaust gas contains about 1½ percent carbon monoxide by volume and about 250 parts per million of hydrocarbons, and after said catalytically induced oxidation said carbon monoxide is reduced to less than 0.5 percent by volume and said hydrocarbons are essentially eliminated.
17. The method defined in claim 11 wherein said salt bath comprises a chemically active salt, said active salt continuously giving up nascent oxygen and retaking ambient oxygen, thereby maintaining a partial decomposition pressure of oxygen gas, the chemical composition of the molten salt remaining substantially unchanged during the oxidation process.

18. The method defined in claim 17 wherein said salt bath contains a eutectic mixture of chemically active salts.

19. The method defined in claim 17 wherein said bath has a melting temperature within the range of 50° C. to 600° C., and is maintained at a temperature level which is about 200° F. above the melting temperature, and said combustion gas contains hydrocarbons.

20. The method defined in claim 11 wherein said bath contains a neutral salt and said bath has a melting temperature within the range of 50° to 600° C., and said combustion gas contains hydrocarbons.

21. The method defined in claim 11 wherein said bath comprises a mixture of chemical oxidizers maintained at a temperature level which is less than 200° F. above the melting temperature of such mixture, said bath at such temperature having the properties of a neutral salt bath.

22. In the method defined in claim 9, the step comprising producing exhaust gas from an automotive exhaust system, said gas being transmitted to and contacted with said molten salt, said molten salt having a melting temperature which is below the combustion temperature at which said exhaust gas was produced and said salt being in the form of a molten salt bath maintained in a molten state by the heat of said automotive exhaust gas.

23. In the method defined in claim 9, the step comprising heating said molten salt by means of externally supplied heat.

24. In the method as described in claim 9, the step comprising heating said molten salt solely from the heat content of said gas.

25. In the method defined in claim 11, the step comprising contacting said discharged gas with said molten salt bath to further oxidize remaining unburned pollutants.

26. In the method as described in claim 9, the step comprising adding to the salt bath a getter selected from the group consisting of cupric oxide, sodium oxide, magnesium oxide, manganese oxide, zinc oxide, calcium oxide, barium oxide, and other alkali metal and alkaline earth metal oxides, for removal of noxious gases such as nitrogen oxide and sulfur oxides.

27. In the method as described in claim 26, the step comprising skimming residues from the surface of said bath and dredging residues from the bottom of said bath.

28. The method defined in claim 9, wherein said combustion gas is contacted with said molten salt by introducing said gas within said molten salt.

29. The method defined in claim 9 wherein said molten salt is in the form of a molten salt bath and wherein said combustion gas is contacted with said molten salt bath by bringing said gas into contact with the surface of said bath.

30. In the method defined in claim 9, the step comprising spraying said molten salt, said combustion gas being contacted with said molten salt by introducing said gas into a spray chamber wherein said salt is sprayed.

31. The method of oxidizing to carbon dioxide and water, pollutants selected from the group consisting of unburned carbon monoxide and hydrocarbons contained in a combustion gas, which comprises contacting said combustion gas with a stable molten salt bath comprising a neutral, ionic and inorganic salt, in the presence of oxygen, said bath having a melting temperature in the range of 50° to 600° C. and acting as a catalyst in inducing said oxidation, the chemical composition of such molten bath remaining substantially unchanged during said oxidation of the pollutants.

32. The method defined in claim 21 wherein oxidation of hydrocarbons contained in said gas raises the temperature at the surface of said bath sufficiently to oxidize carbon contained in said gas.

33. In the method defined in claim 31, the steps comprising burning fuel in a combustion chamber at a combustion temperature and thereby obtaining said gas consisting of said pollutants, and maintaining said molten salt bath at a temperature which is below said combustion temperature, and discharging said oxidized gas having reduced amounts of said pollutants.

34. In the method defined in claim 33, the step comprising mixing said gas with oxygen prior to contacting said gas with said bath.

35. In the method defined in claim 31, the step comprising heating said molten salt bath by externally supplied heat.

36. In the method defined in claim 31, the step comprising heating said molten salt bath solely by the heat content of said gas.

37. In the method defined in claim 31, the step comprising adding to the salt bath a getter selected from the group consisting of cupric oxide, sodium oxide, magnesium oxide, manganese oxide, zinc oxide, calcium oxide, barium oxide, and other alkali metal and alkaline earth metal oxides, for removal of noxious gases such as nitrogen oxide and sulfur oxides.

38. In the method defined in claim 37, the step of skimming residues from the surface of said bath and dredging residues from the bottom of said bath.

39. The method defined in claim 31, wherein said combustion gas is contacted with said molten salt bath by introducing said gas within said bath.

40. The method defined in claim 31, wherein said combustion gas is contacted with said molten salt bath by bringing said gas into contact with the surface of said bath.

41. The method of oxidizing to carbon dioxide and water, pollutants selected from the group consisting of unburned carbon monoxide, hydrocarbons and mixtures thereof contained in a combustion gas, which comprises contacting said combustion gas with a stable molten salt bath comprised of chemically active salts which are ionic and inorganic, said bath having a melting temperature within the range of 50° to 600° C., and having the property of continuously giving up nascent oxygen and retaking oxygen from the ambient, thereby maintaining a partial decomposition pressure of oxygen gas, the bath acting as a catalyst in inducing said oxidation, with the chemical composition of such molten salt bath remaining substantially unchanged during said oxidation of the pollutants.

42. In the method defined in claim 41, the step comprising maintaining said salt bath at a temperature below the normal combustion temperature of said pollutants in said combustion gas.

43. In the method defined in claim 41, the steps comprising burning fuel in a combustion chamber at a combustion temperature and thereby obtaining said gas consisting of said pollutants, and maintaining said molten salt bath at a temperature less than said combustion temperature, and discharging said oxidized gas which has reduced amounts of said pollutants.

44. In the method defined in claim 43, the step comprising maintaining said molten bath at a temperature about 200° F. above the melting point of said bath.

45. In the method defined in claim 43, the step comprising mixing said gas with oxygen prior to contacting said gas with said bath.

46. The method defined in claim 41 wherein said salt bath comprises a chemically active salt.

47. The method defined in claim 41 wherein said salt bath is comprised of a mixture of nitrates having a melting temperature below 300° C., and said combustion gas is automotive exhaust gas.

* * * * *

UNITED STATES PATENT OFFICE
CERTIFICATE OF CORRECTION

Patent No. 3,647,358          Dated March 7, 1972

Inventor(s) Jacob Greenberg

It is certified that error appears in the above-identified patent and that said Letters Patent are hereby corrected as shown below:

Column 8, lines 72-73, delete "60 M% $KNO_3$ - 25 M% $LiNO_3$ - 15 M% $Ca(NO_3)_2$   130°C".

Column 12, line 41, change "forces" to --forced--.

Column 12, line 71, delete "NEUTRAL", and insert therefor --of--

Column 15, line 13, delete "chemical oxidizers" and insert therefor --chemically active salts--.

Column 15, line 64, delete "21" and insert therefor --31--.

Signed and sealed this 15th day of August 1972.

(SEAL)
Attest:

EDWARD M. FLETCHER, JR.
Attesting Officer

ROBERT GOTTSCHALK
Commissioner of Patents